United States Patent
Rostalski (10) Patent No.: US 11,247,450 B2
(45) Date of Patent: Feb. 15, 2022

(54) METHOD FOR DETERMINING PRINT PARAMETERS OF A PRINTING MACHINE AND TEST STAND

(71) Applicant: Bobst Bielefeld GmbH, Bielefeld (DE)

(72) Inventor: Fred Rostalski, Bielefeld (DE)

(73) Assignee: Bobst Bielefeld GmbH, Bielefeld (DE)

( * ) Notice: Subject to any disclaimer, the term of this patent is extended or adjusted under 35 U.S.C. 154(b) by 0 days.

(21) Appl. No.: 17/090,617

(22) Filed: Nov. 5, 2020

(65) Prior Publication Data

US 2021/0146677 A1     May 20, 2021

(30) Foreign Application Priority Data

Nov. 18, 2019    (EP) .................................... 19020644

(51) Int. Cl.
| | |
|---|---|
| *B41M 1/04* | (2006.01) |
| *B41F 33/00* | (2006.01) |
| *B41F 5/24* | (2006.01) |
| *G06T 7/80* | (2017.01) |
| *B41J 2/21* | (2006.01) |

(52) U.S. Cl.
CPC ............ *B41F 5/24* (2013.01); *B41F 33/0027* (2013.01); *B41J 2/2132* (2013.01); *B41M 1/04* (2013.01); *G06T 7/80* (2017.01)

(58) Field of Classification Search
None
See application file for complete search history.

(56) References Cited

U.S. PATENT DOCUMENTS

| | | | |
|---|---|---|---|
| 2010/0018419 A1* | 1/2010 | Whitelaw | ................ B41F 5/20 101/248 |
| 2019/0155173 A1 | 5/2019 | Tsiatmas et al. | |
| 2020/0039208 A1 | 2/2020 | Bettfuhr et al. | |

FOREIGN PATENT DOCUMENTS

| | | |
|---|---|---|
| CN | 102381013 A | 3/2012 |
| CN | 109996680 A | 7/2019 |
| TW | 201925910 A | 7/2019 |
| TW | 201937304 A | 9/2019 |

(Continued)

OTHER PUBLICATIONS

Taiwanese Office Action dated Apr. 26, 2021 in counterpart Taiwanese Patent Application No. 109136484 (22 pages, in Chinese with English translation).

*Primary Examiner* — Joshua D Zimmerman
(74) *Attorney, Agent, or Firm* — Bookoff McAndrews, PLLC (57) ABSTRACT

A method for the determination of print parameters of a printing machine, particularly a flexographic printing machine, comprises the following steps: First, a print form (12) is provided and mounted on a print cylinder (14). Then, at least one high-resolution image of the surface of the print form (12) is recorded by means of a 3D camera (18). On the basis of the at least one high-resolution image a height profile of the print form (12) is determined and then a simulated print image is calculated on the basis of the height profile and an initial set of print parameters. Finally, optimized print parameters are determined by checking and/or varying the print parameters of the initial set. For this purpose, a simulated print image is calculated again after the print parameters have been varied.
In addition, a test stand is specified on which such a method can be carried out.

12 Claims, 5 Drawing Sheets

(56) References Cited

FOREIGN PATENT DOCUMENTS

| WO | 2019121491 | A1 | 6/2019 |
|----|------------|----|--------|
| WO | 2019160032 | A1 | 8/2019 |

* cited by examiner

METHOD FOR DETERMINING PRINT PARAMETERS OF A PRINTING MACHINE AND TEST STAND

CROSS-REFERENCE TO RELATED APPLICATION(S)

This application claims the benefit of priority under 35 U.S.C. § 119 from European Patent Application No. 19020644.1, filed on Nov. 18, 2019, the contents of which is incorporated by reference in its entirety.

The invention relates to a method for the determination of print parameters of a printing machine, in particular a flexographic printing machine, and a test stand for it.

In printing machines, a print form is used to apply ink to a substrate, for example paper or plastic. Depending on the kind of the print process, the print forms have elevations (letterpress) or depressions (gravure printing), which serve the purpose to transfer the ink from the print form to the substrate.

In flexographic printing, flexible cliches with a height relief are used to apply ink. The cliches are made of a plastic, a photopolymer or rubber and are produced individually for each print job on the basis of a digital print template.

The problem arises here that in the production process of the cliche, deviations between the digital print template and the fully mounted cliche can occur, for example irregularities in the height relief obtained. The print cylinders on which the cliches are mounted also have tolerances with regard to their dimensions and their geometric shape.

Just like the print cylinders, the ink transfer rollers of the printing machines, also referred to as anilox rollers, have manufacturing-related dimensional and shape deviations. The stepover values of the ink transfer rollers are among the setting parameters of the flexographic printing machine.

The quality of the achievable print can therefore only be assessed on the basis of several test prints in the flexographic printing machine. In addition, the print result is dependent on a plurality of print parameters of the flexographic printing machine, which must be determined on the basis of the test prints for an optimal print result.

The machine running times of the flexographic printing machine are, however, relatively expensive, so that the set-up times of the flexographic printing machine, in which no finished product can be produced, should be kept as short as possible.

Similar problems can occur in gravure printing, for example due to irregularities in the gravures of the print forms.

The object of the invention is to provide a more cost-effective method to determine optimized print parameters for a printing machine, and to provide a device for such a method.

The object of the invention is achieved by a method for the determination of print parameters of a printing machine, comprising the steps of:

providing a print form and mounting the print form on a print cylinder, recording at least one high-resolution image of the surface of the print form by means of a 3D camera, determining a height profile of the print form on the basis of the at least one high-resolution image, calculating a simulated print image on the basis of the height profile and an initial set of print parameters, and determining optimized print parameters by checking and/or varying the print parameters of the initial set, wherein in step e) a simulated print image is calculated again in accordance with step d) after the print parameters have been varied.

A 3D camera makes it possible not only to obtain a two-dimensional depiction of the surface of the print form, but also height and depth information on the surface based on a distance measurement between the 3D camera and the surface.

This means that precise information about the height profile of the print form mounted on the print cylinder can be determined from the image recorded by the 3D camera.

The 3D camera can record images based on triangulation methods, a time-of-flight measurement and/or an interferometric measurement method.

One advantage of the method according to the invention is that the image can be recorded outside the printing machine. The method according to the invention can thus be carried out as a preceding step before the print cylinder is inserted into the printing machine, and in this way the set-up time of the printing machine can be reduced.

The print results obtained in the subsequent printing can be calculated or simulated from the height profile. The print parameters of the printing machine and the properties of the substrate, for example paper or plastic, can be included in the calculation.

In other words, a test print is simulated, which can then be checked for sufficient quality. In addition, it is possible in a simple manner to vary the print parameters in the simulation and thus to obtain optimized print parameters.

This can also be carried out as an iterative process, so that the print parameters are varied several times until a satisfactory set of print parameters has been obtained.

The method according to the invention has also the advantage that no ink and no substrate is consumed for checking the print quality achievable.

The printing machine is preferably a flexographic printing machine and the print form is a cliche. By producing the cliche from a plastic, a photopolymer or rubber, there can be slight deviations in the height profile of the cliche. Therefore, the method according to the invention is particularly suitable for use in connection with flexographic printing machines.

In order to obtain a complete image over the entire length of the print form, the print cylinder with the print form mounted on it can be rotated during step b). In other words, the print form is rotated by means of the print cylinder during step b).

In addition, the 3D camera can be attached to a movable carrier that allows the 3D camera to be displaced, in particular parallel to the axis around which the print form is rotated by means of the print cylinder. The high-resolution images recorded by the 3D camera can thus show both the entire width and the entire length of the print form, so that the simulated print image is a complete image of the subsequent printing.

The movable carrier can also be configured to set the distance between the 3D camera and the print form. The movable carrier accordingly allows an exact setting of the distance between the 3D camera and the surface of the print form to be considered, for example for image focusing.

In particular for very large print forms, such as those used for very large print widths, several 3D cameras can be provided, which are arranged distributed over the width of the print form. As a result, several images of the print form can be recorded at the same time, which shortens the time required to record the image of the surface of the print form.

The movement of the carrier can be done via one or more linear drives, which are, for example, operated by an electric motor.

The at least one high-resolution image can depict the surface of the print form with a resolution of 1 to 50 µm, preferably with a resolution of 1 to 10 µm. When choosing the resolution, it is crucial that the recorded image allows the height profile of the print form to be determined with sufficiently high accuracy. In other words, the elevations on the surface of the printing plate must be depicted adequately clearly to distinguish them from each other.

In a variant, to determine the height profile in step c), the high-resolution image is divided into sub-areas, each sub-area comprising several image points of the high-resolution image, and a histogram of the height of the surface of the print form at the image points being created for each of the sub-areas.

The histogram thus represents a depiction of the printable points within the sub-area. The height profile is essentially determined by the pressure points or depressions present on the print form, the height or depth of which differs significantly from areas of the print form without corresponding pressure points or depressions.

The histogram can be used to determine an expected color imprint, based on the ratio of the area of the elevations or dips on the surface of the cliche, which is predetermined in particular by the number of print points or depressions, relative to the area on which the substrate is not printed.

In particular, it can be provided that in step d) an expected color imprint is calculated from the histogram created in step c) for all the inks intended to be used in printing, on the basis of which the simulated print image is calculated.

In particular, the color imprint is calculated for the CMYK color space or an extended color space, that is to say, for the inks that are usually used subsequently in printing machines.

In a further variant, the expected dot gain is included in the calculation of the simulated print image. The dot gain describes the effect that points applied by means of a print process on the substrate are deformed to some extent as compared to the pressure points or depressions existing on the print form, for example, broadened by bleeding. This makes the printed image appear darker in the finished print.

However, the substrate that will be considered later is usually known, so that the size of the dot gain based on the material properties and the inks used is also known. Correspondingly, the simulated print image can be adapted using this known value in such a way that the influence of the dot gain is already taken into account in the simulated print image.

For unknown inks and substrates test prints can be created with known color gradients, in order to determine the unknown dot gain curves.

After the simulated print image has been calculated, it can be depicted on a display. In particular, the display is a true color display with a color depth of 24 bits or another color-true image depiction. This particularly allows the checking of the simulated print images to be done by operating personnel, which is trained in carrying out the method according to the invention.

In addition, after the print parameters have been varied, the print image can be depicted again on the display so that the influence of the changed parameters on the simulated print image becomes clear. For this purpose, one or more of the previously simulated print images can also be depicted on the display for comparison.

The simulated print image can also be depicted on the display in color-separated form. In other words, the image is depicted individually for each of the inks used later in the print, so that influences can also be recognized that only occur in connection with one of the colors. This means that the print parameters can also be optimized for each individual color.

Furthermore, the simulated print image can be compared with a reference print image in step e). Such a reference print image can be, for example, the so-called PDF proof, especially the so-called soft proof. The PDF document associated with the PDF proof is used in the production of prints as a digital preliminary stage, on the basis of which the print form is produced.

Thus, by comparing the simulated print image with the PDF proof, it is also possible to identify manufacturing defects in the print form. These manufacturing defects can be at least partially compensated for using the optimized print parameters. In addition, information about the manufacturing process of the print form can be obtained.

In particular, the simulated print image is compared in color-separated form with the color-separated reference print image. This means that deviations in the print quality of individual colors can also be recognized and taken into account when determining the optimized print parameters.

In order to further improve the accuracy of the high-resolution image, the position of the 3D camera can be calibrated using a reference cylinder prior to step b).

The position of the 3D camera relative to the print form is not necessarily constant along the direction of movement of the movable carrier on which the 3D camera can be mounted. Rather, small deviations, for example due to manufacturing tolerances and/or inaccuracies in assembly are to be expected, which, on the basis of the accurately manufactured reference cylinder, can be determined in advance and can be considered when recording the at least one high-resolution image and the determination of the height profile.

Even if the method according to the invention has been described specifically in connection with the determination of print parameters of a flexographic printing machine, the method is suitable analogously for all printing methods using a print form, in particular for letterpress methods. On the basis of the high-resolution images and the determined height profile, the exact dimensions of the print forms can also be determined in this case and simulated print images can be calculated by means of which optimized print parameters can be determined. The same also applies to alternative forms of the print cylinder. A flat print form that can be used on non-round print cylinders could also be used.

The object of the invention is further achieved by a test stand to determine pressure parameters of a printing machine, particularly a flexographic printing machine, with a light source, a 3D camera, an evaluation unit, a display and an operating unit, wherein the test stand is set up to carry out the method described above.

Accordingly, the test stand is precisely not part of the printing machine, so that the optimized print parameters can be determined in a preparatory step of the printing.

The test stand can be combined with the cliche mounting device so that the surface of the print form can be measured immediately after mounting the print form on the print cylinder.

The evaluation unit comprises, in particular, a computer that is used to calculate the simulated print image. In particular, the computer can receive an initial set of print parameters from the printing machine and/or transmit optimized print parameters to the printing machine.

The evaluation unit may also comprise a programmable logic controller (PLC), which is used for control or regulation of the test stand and/or the printing machine.

The display and the operating unit can also form a single component, for example in the form of a touch screen or tablet.

The display can also be an additional display, in particular a true color display with a color depth of 24 bits or another true-color image depiction.

Analogously to determining the surface of the print form, the test stand can also determine the exact measurements and the exact form of an ink transfer roller by means of the 3D camera, to be used in subsequent printing to supply the print form with ink. In this way, optimized print parameters can be obtained in the form of setting parameters for the ink transfer roller.

Further advantages and characteristics of the invention will result from the following description of exemplary embodiments and from the drawings.

Figure 1:
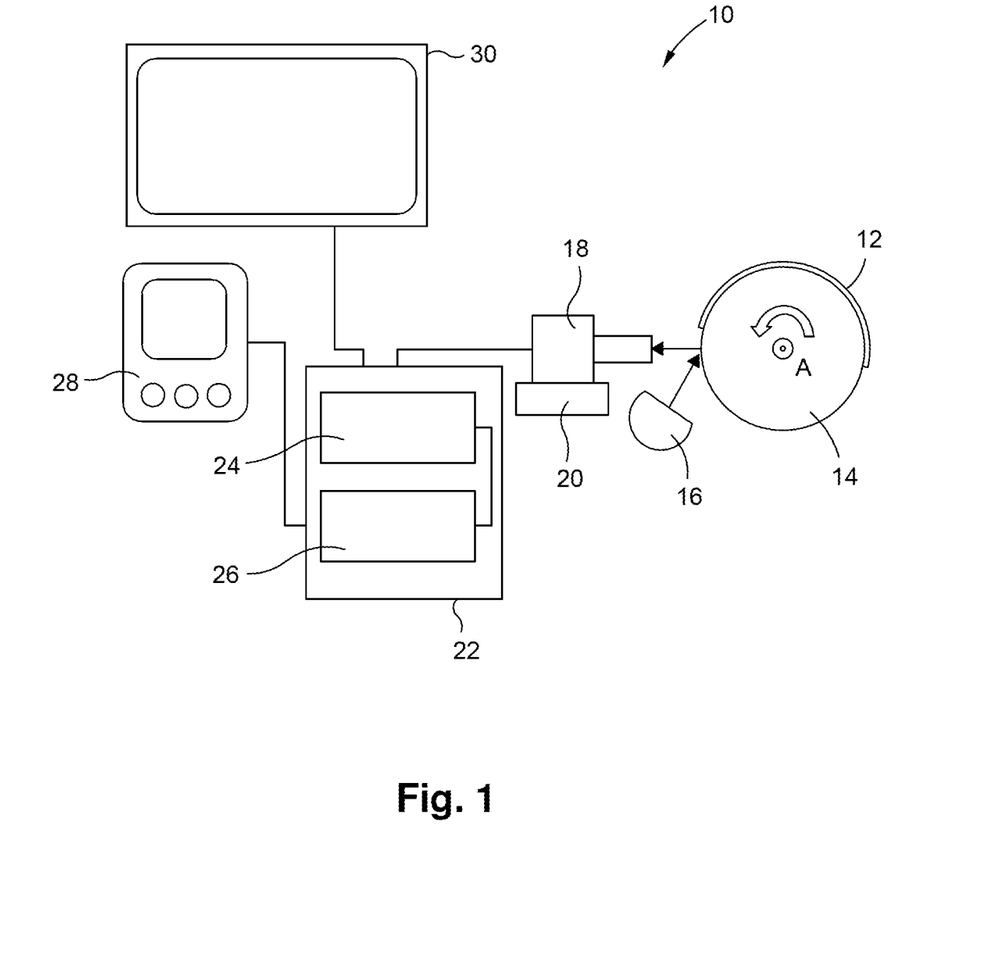
FIG. 1 shows a test stand according to the invention for the determination of print parameters of a flexographic printing machine.

FIG. 1 shows a test stand 10 according to the invention for the determination of print parameters of a printing machine (not depicted). In the embodiment depicted, the printing machine is a flexographic printing machine.

The test stand 10 is to be used to test a previously prepared print form 12, which is intended for printing in the flexographic printing machine. As a consequence, the print form 12 in the embodiment depicted here is a cliche. The cliche is usually produced individually for each print job from a plastic, a photopolymer or rubber. Mentioning the cliche below also generally includes the print form 12.

The quality of the print is a function of the quality of the respective cliche, as well as the print parameters used. For an optimum print result the print parameters must therefore be adapted to the respective cliche produced.

The cliche is mounted on a print cylinder 14, which is subsequently put in the flexographic printing machine together with the cliché for the flexographic printing.

To determine optimized print parameters, the print cylinder 14 is mounted on the test stand 10 by means of a holder (not depicted).

The print cylinder 14 can be rotated about its longitudinal axis A, as indicated in FIG. 1 by an arrow. The cliche attached to the print cylinder 14 is correspondingly rotated together with the print cylinder 14.

The test stand 10 has a light source 16 which illuminates the cliche and the print cylinder 14, as indicated in FIG. 1 by an arrow.

A 3D camera 18 is arranged in front of the print cylinder 14 and can record high-resolution images of the surface of the cliche.

The light source 16 provides for sufficient illumination of the surface of the cliche so that the 3D camera 18 can record images with sufficient high-resolution.

The 3D camera 18 is attached to a movable carrier 20 that allows a linear displacement of the 3D camera 18 parallel to the longitudinal axis A, that is, along the width of the cliche. For this purpose, the movable carrier 20 can have an electric motor (not depicted) as a drive.

In addition, the 3D camera 18 is connected to an evaluation unit 22 and can send the recorded high-resolution images to the evaluation unit 22.

In the embodiment depicted in FIG. 1, the evaluation unit 22 has a computer 24 as well as a programmable logic controller 26 (PLC).

The evaluation unit 22 is also connected to an operating unit 28. The operating unit 28 is, for example, a tablet or a touchpad and is used to control the test stand 10.

The test stand 10 also has a display 30 that is connected to the evaluation unit 22 for data exchange.

The display 30 is a true color display with a 24-bit color depth and is therefore particularly suitable for the true-color display of images.

The operating principle of the test stand 10 according to the invention is explained below in connection with a method according to the invention for the determination of print parameters of the flexographic printing machine.

Figure 6:
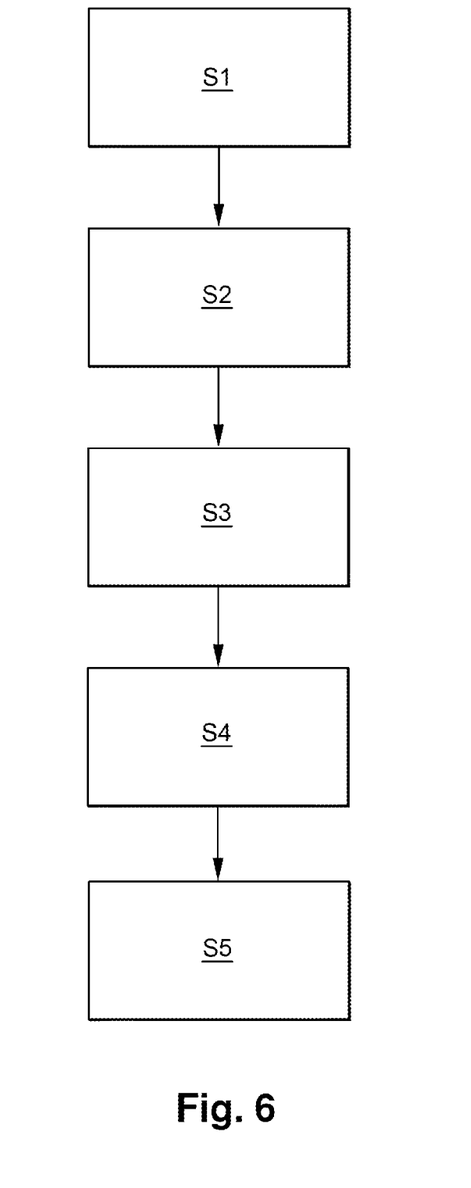
FIG. 6 shows a block diagram of the method according to the invention.

First, the cliche is provided and mounted on the print cylinder 14 (step S1 in FIG. 6).

The print cylinder 14 is previously or subsequently mounted in the test stand 10.

The distance between the 3D camera 18 and the print cylinder 14 is predetermined by the test stand 10. This distance must be known as precisely as possible, since the value of the distance is of crucial importance for the subsequent determination of a height profile of the cliche.

Deviations can arise primarily due to deviations in the linear movement of the movable carrier 20 due to technical reasons.

If necessary and/or at regular intervals, the position of the 3D camera 18 can therefore be calibrated. This process is depicted schematically in FIG. 2.

Figure 2:
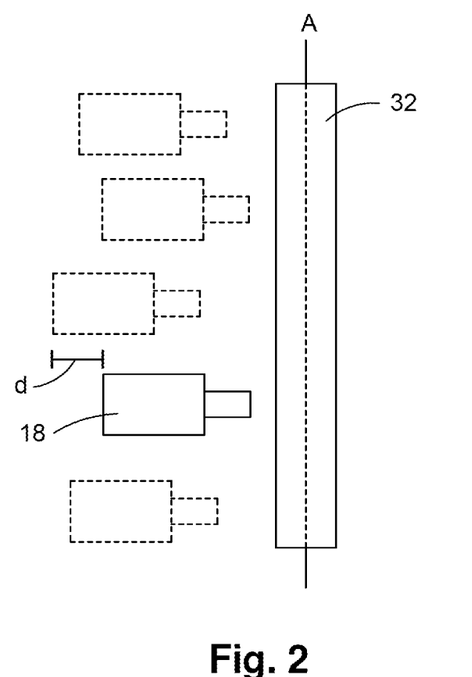
FIG. 2 shows a schematic depiction of the calibration of the test stand of FIG. 1.

A reference cylinder 32 with known geometry, which is mounted in front of the 3D camera 18 in the test stand 10, is used for the calibration. In order to ensure a uniform surface on the reference cylinder 32, the surface can be ground in shape.

Then the 3D camera 18 is moved parallel to the axis A by means of the movable carrier 20 and an image is recorded by the 3D camera 18 in various positions along the direction of movement, on the basis of which the evaluation unit 22 calculates the distance to the reference cylinder 32 for each of the positions.

Any deviations, for example, the distance d marked in FIG. 2, can be stored in the evaluation unit 22 and subsequently taken into account in the calculation of a height profile.

Referring again to FIG. 1, in the method according to the invention in step b) (step S2 in FIG. 6), several high-resolution images of the surface of the cliche are recorded by means of the 3D camera 18.

In principle, only a single image of the surface of the cliche could be produced and the print parameters of the flexographic printing machine could be determined exclusively based on this image.

However, a plurality of high-resolution images are preferably recorded which depict more than 50% of the surface of the cliche, particularly preferably the entire surface of the cliche.

In order to record images of a larger area of the surface of the cliche, the print cylinder 14 rotates about its longitudinal axis A, as a result of which the entire length of the cliche passes through the camera field of the 3D camera 18.

The rotation can take place in stages or continuously. It is only important that the orientation of the cliche is known at all times and that this information is linked to the image recorded.

In addition, the 3D camera 18 can be moved parallel to the longitudinal axis A by means of the movable carrier 20, as a result of which the 3D camera 18 can also pass through the entire width of the cliche.

A complete image of the surface of the cliche can thus be recorded by the 3D camera 18.

The light source 16 ensures that the surface of the cliche is illuminated so strongly that images of sufficient high-resolution can be recorded by the 3D camera 18.

The high-resolution images depict the surface of the cliche with a resolution of 1 to 50 μm, preferably with a resolution of 1 to 10 μm.

Figure 3:
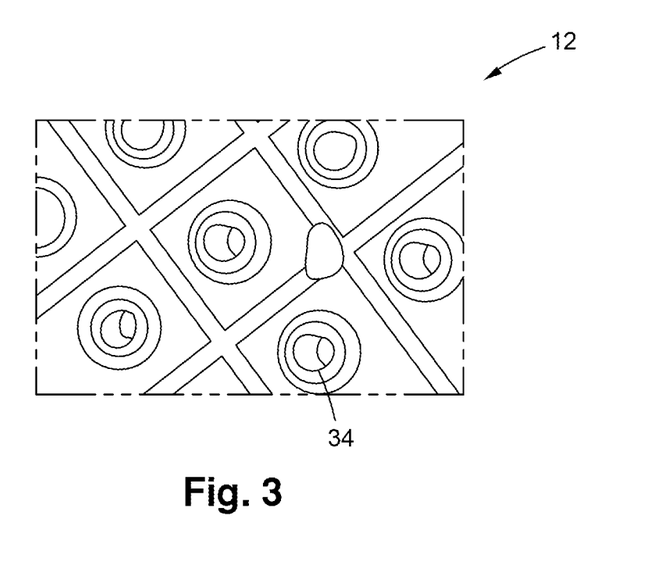
FIG. 3 shows a schematic depiction of a high-resolution image, as recorded by means of the test stand of FIG. 1.

An exemplary image of the surface of the cliche is depicted in FIG. 3. The cliche has a plurality of print points 34 which are formed as elevations on the surface of the cliche and are used in flexographic printing for the application of ink.

The image depicted in FIG. 3 has a resolution of 5 μm. As can be seen, this resolution is sufficient to be able to clearly differentiate the print points 34 from one another.

The high-resolution images are then sent from the 3D camera 18 to the evaluation unit 22, in the embodiment depicted, to the computer 24.

A height profile of the cliche is then determined on the basis of the high-resolution images (step S3 in FIG. 6). In the embodiment depicted in FIG. 1, this is done by means of the computer 24.

Figure 4:
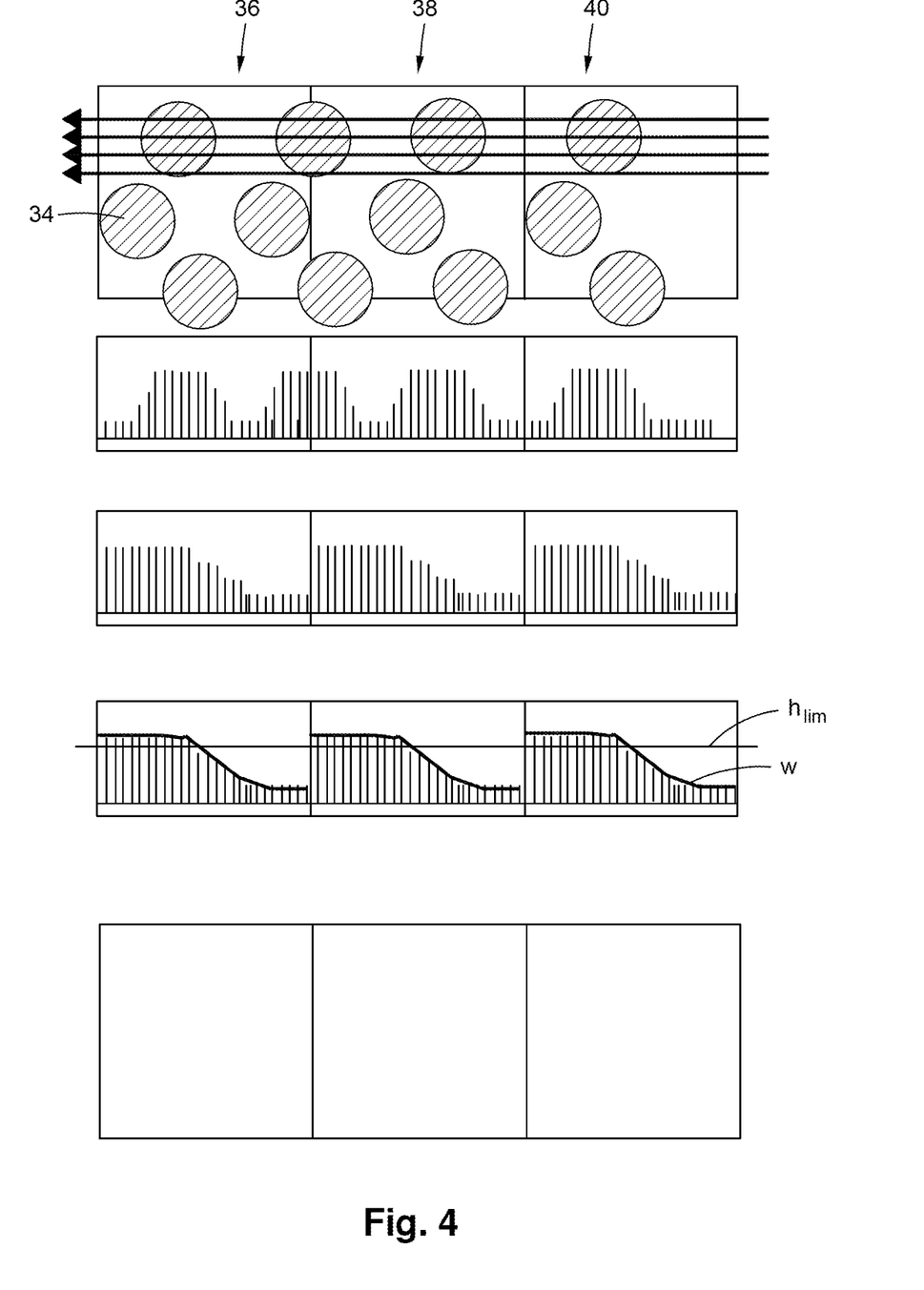
FIG. 4 shows a schematic depiction of steps of the method according to the invention for the calculation of an expected color imprint.

FIG. 4 schematically depicts the sequence for the determination of the height profile. First, the high-resolution image is divided into sub-areas, for example in FIG. 4 into the square sub-areas 36, 38, 40.

Each sub-area 36, 38, 40 comprises a plurality of image points of the high-resolution image, that is to say several rows and columns of pixels.

As can be seen in FIG. 4, several of the print points 34 are located in each of the sub-areas 36, 38, 40.

For each of the pixel rows of the high-resolution image, of which only four are indicated by arrows in FIG. 4, a histogram of the height profile is created for each of the sub-areas 36, 38, 40, as shown in the second depiction from the top in FIG. 4.

The histogram of each of the sub-areas 36, 38, 40 particularly has a digitization which corresponds to the number of pixel columns of the respective sub-area 36, 38, 40.

The histograms of each of the sub-areas 36, 38, 40 over all the pixel rows are then combined and sorted according to size. Finally, a histogram is obtained for each of the sub-areas 36, 38, 40, as shown in the third depiction from the top in FIG. 4.

The highest value of the histogram and the position and slope of the drop from this highest value represents a characteristic variable for the height profile and the number of print points 34 in each of the sub-areas 36, 38, 40.

A simulated print image can be calculated from the histogram obtained in this way on the basis of the height profile and an initial set of print parameters of the flexographic printing machine (step S4 in FIG. 6).

For this purpose, a color imprint is first calculated from the previously created histograms for the inks intended for printing.

For this purpose, a previously defined number of points in the histogram, for example six to eight points, can be compared with a threshold value him, as shown in the fourth depiction from the top in FIG. 4.

The threshold value him indicates a height limit which must be exceeded by the surface of the cliche in order to bring about an application of ink in the subsequent printing. Accordingly, all areas of the image the values of which are below this threshold value him in the histogram only have the color of the substrate after printing.

Using the ratio of the number of points in the histogram which are above and below the threshold value him in one of the sub-areas 36, 38, 40, the resulting color imprint of the respective sub-area 36, 38, 40 can therefore be calculated, which is achieved after printing with known inks and known substrate.

The threshold value him is determined from an initial set of print parameters and can be shifted by changing the print parameters.

To determine the color imprint, the histogram can also be described using a line w which, for example, indicates the course of values of the histogram, as shown in FIG. 4. On the basis of this line w, further colorimetric analyzes can be carried out.

Finally, it is assumed for the entire respective sub-area 36, 38, 40 that, after printing, it has the color imprint of the determined ink for a viewer, as shown in the fifth depiction from the top in FIG. 4.

In the same way, the color imprint can be calculated individually for all the inks intended to be used in the subsequent printing.

A simulated print image can then be calculated from all the calculated color imprints for all sub-areas of the image.

The dot gain can also be taken into account in the calculation of the simulated print image, wherein the dot gain can also be taken into account individually for each of the inks intended to be used in the printing.

On the basis of the simulated print image, the print parameters can then be checked and/or varied if necessary, in order to obtain optimized print parameters (step S5 in FIG. 6).

The simulated print image can, for example, be displayed on the display 30 and checked by operating personnel of the test stand 10.

Figure 5:
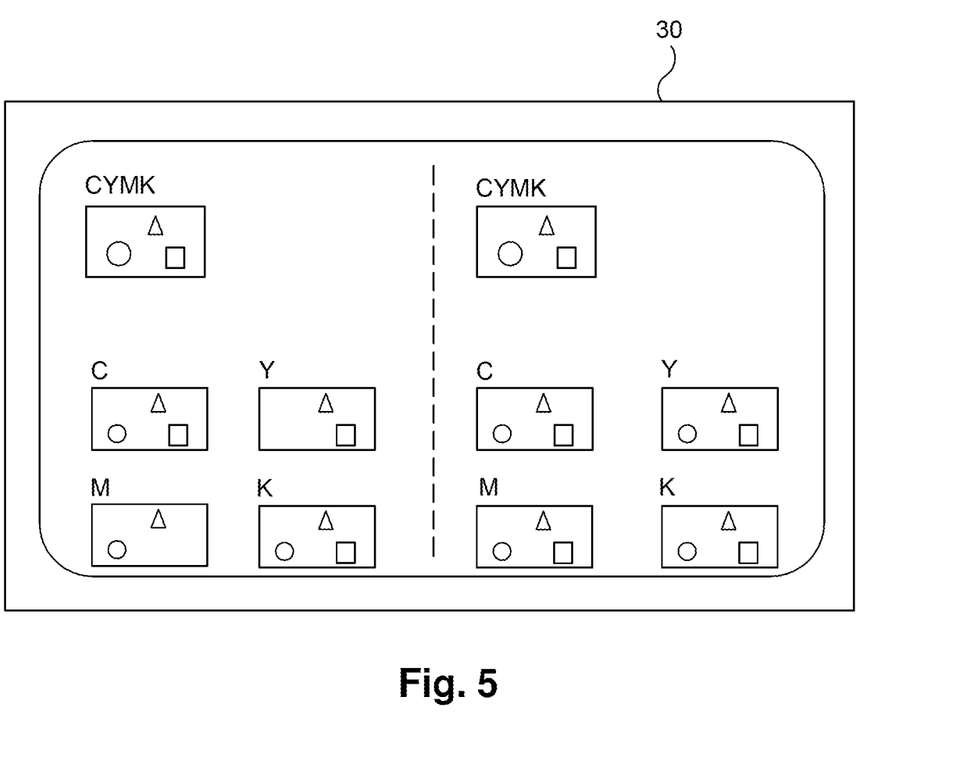
FIG. 5 shows a display of the test stand of FIG. 1 during the method according to the invention.

An exemplary depiction on the display 30 is shown schematically in FIG. 5.

On the left half of the screen, the simulated print image is depicted in color-separated form (C, M, Y and K) and in a combination of all colors (CMYK). In FIG. 5, simulated print images are calculated for a total of four colors (C—cyan, M—magenta, Y—yellow and K—black).

Accordingly, the operating personnel can assess the quality of the simulated print image on the basis of the depiction on the display 30.

In addition, in the depiction shown in FIG. 5, a reference print image is displayed on the right half of the screen of the display 30, with which the simulated print image is compared. In particular, the reference print image is a color-separated PDF proof, in this case a soft proof. This enables any deviations caused by the cliche produced to be identified.

For example, deviations from the motif for the colors yellow and magenta can be seen on the left half of the screen of the display 30.

Using the operating unit 28, varied print parameters can be proposed.

For example, various ink compositions, various substrates and/or print settings of the flexographic printing machine can be proposed.

If the print parameters are varied, a new simulated print image is calculated according to the method described above, which is depicted on the display 30. Several of the previously simulated print images can also be depicted on the display 30 for comparison.

The impact of the varied print parameters can thus be easily identified. The method according to the invention can be carried out accordingly by less qualified operating personnel as possible with previous methods, because the impact of various print parameters can be tested and can be checked directly, without extending the set-up time of the flexographic printing machine.

In principle, instead of a separate display 30, the test stand could only have a display on the operating element 28, which is used to check the simulated print images.

It is also possible that the simulated print images are not checked by operating personnel, but only by the evaluation unit 22 by comparison with the reference image. For this purpose, the evaluation unit 22 can also have a module for image recognition, which preferably uses a neural network for image recognition.

As soon as an optimized set of print parameters has been found, these print parameters can be transmitted to the flexographic printing machine or set on it.

The print cylinder 14 with the cliche mounted thereon is inserted into the flexographic printing machine and printing can begin immediately. This significantly reduces the set-up time for the flexographic printing machine.

Even if the embodiment shown specifically described the application for a cliche for a flexographic printing machine, the method according to the invention is suitable for a plurality of alternative print forms and printing methods, for example for print forms of a gravure printing machine.

The invention claimed is:

1. A method for determination of print parameters of a printing machine, the method comprising:
   providing a print form and mounting the print form on a print cylinder;
   recording at least one high-resolution image of a surface of the print form by means of a 3D camera;
   determining a height profile of the print form based on the at least one high-resolution image;
   calculating a simulated print image based on the height profile and an initial set of print parameters; and
   determining optimized print parameters by checking and/or varying the initial set of print parameters,
   wherein the determining the optimized print parameters includes calculating a second simulated print image in accordance with the calculated simulated print image after the initial set of print parameters have been varied.

2. The method according to claim 1, wherein the printing machine is a flexographic printing machine and the print form is a cliche.

3. The method according to claim 1, wherein the print form is rotated during the recording of the at least one high-resolution image by means of the print cylinder.

4. The method according to claim 1, wherein the at least one high-resolution image depicts the surface of the print form with a resolution of 1 to 50 µm.

5. The method according to claim 1, wherein the determining the height profile includes:
   dividing the at least one high-resolution image into sub-areas, each sub-area of the sub-areas comprising several image points of the at least one high-resolution image, and
   creating a histogram, for each of the sub-areas, of the height of the surface of the print form measured at the several image points.

6. The method according to claim 5, wherein the calculating the simulated print image includes:
   calculating an expected color imprint from the histogram for all colors provided in the print, and
   calculating the simulated print image based on the expected color imprint.

7. The method according to claim 1, wherein the calculating the simulated print image includes:
   determining an expected dot gain, and
   calculating the simulated print image based on the expected dot gain.

8. The method according to claim 1 further comprising: displaying the simulated print image on a display.

9. The method according to claim 8, wherein the simulated print image is displayed in color-separated form.

10. The method according to claim 8, wherein the determining the optimized print parameters includes comparing the simulated print image with a reference print image.

11. The method according to claim 1, further comprising, before the recording the at least one high-resolution image, calibrating a position of the 3D camera based on a reference cylinder.

12. A test stand configured to perform the method according to claim 1, said test stand comprising:
   a light source,
   the 3D camera,
   an evaluation unit,
   a display, and
   an operating unit.

* * * * *